United States Patent

Taylor et al.

[15] 3,643,601
[45] Feb. 22, 1972

[54] TRANSPORTATION SYSTEM

[72] Inventors: Paul A. Taylor, East Hartford, Conn.; Thomas A. Boissevain, Bedford, Mass.

[73] Assignee: Alden Self-Transit Systems Corporation, Bedford, Mass.

[22] Filed: June 1, 1970

[21] Appl. No.: 41,954

[52] U.S. Cl. .................................104/88, 104/119, 105/144
[51] Int. Cl. .....................................B61b 5/02, B61b 13/00
[58] Field of Search ..........................104/1, 88, 130, 244.1; 105/144; 180/79

[56] References Cited

UNITED STATES PATENTS

| | | | |
|---|---|---|---|
| 3,393,762 | 7/1968 | Matson | 180/79 |
| 3,451,351 | 6/1969 | Hawes | 104/130 |
| 1,310,664 | 7/1919 | Klassen | 104/244.1 |
| Re15,214 | 10/1921 | Whipple | 104/244.1 |
| 3,500,765 | 3/1970 | Easton | 104/130 |
| 3,098,454 | 7/1963 | Maestrelli | 104/244.1 |
| 2,465,660 | 3/1949 | Phillips | 104/244.1 |

Primary Examiner—Arthur L. La Point
Assistant Examiner—D. W. Keen
Attorney—Willis M. Ertman

[57] ABSTRACT

A vehicle includes a steering mechanism and a switching mechanism that includes biasing means for biasing the steering mechanism in a selected direction away from a predetermined vehicle path, and guide sensor means for resisting the biasing means in response to path defining means external of the vehicle for maintaining the vehicle on a predetermined path.

11 Claims, 10 Drawing Figures

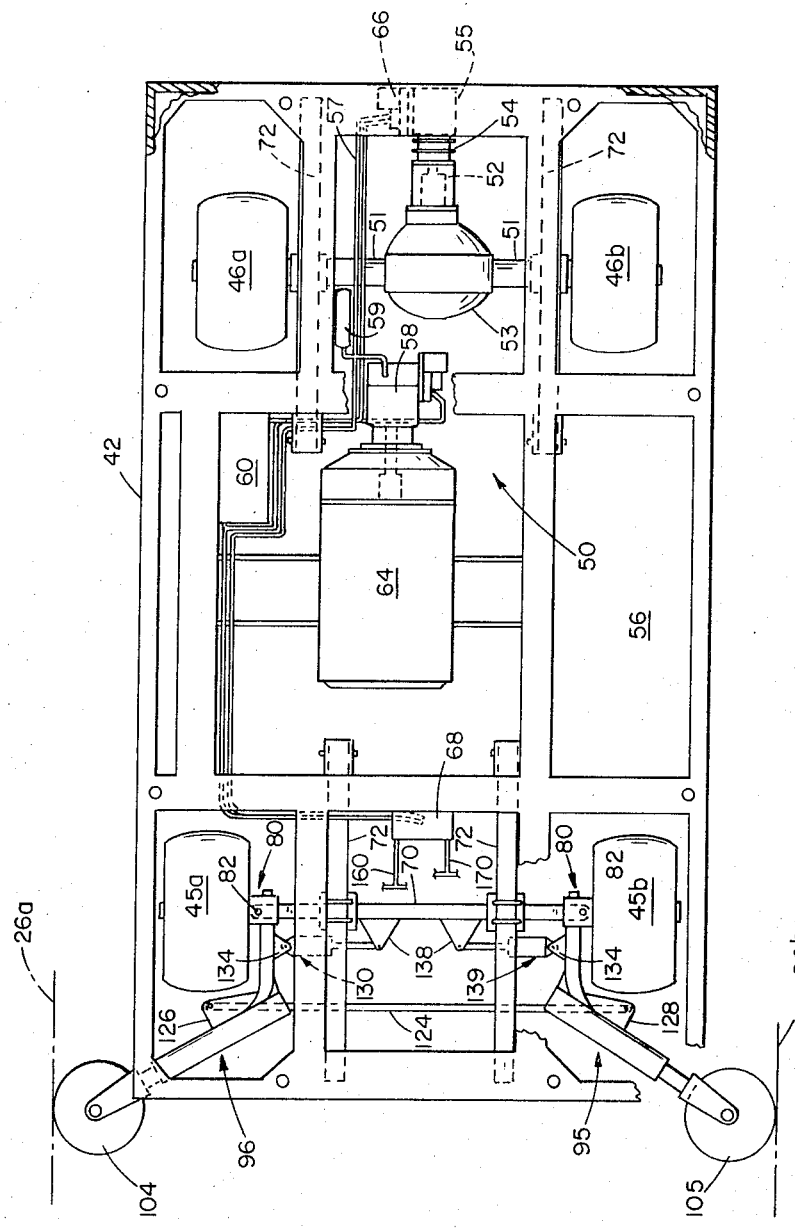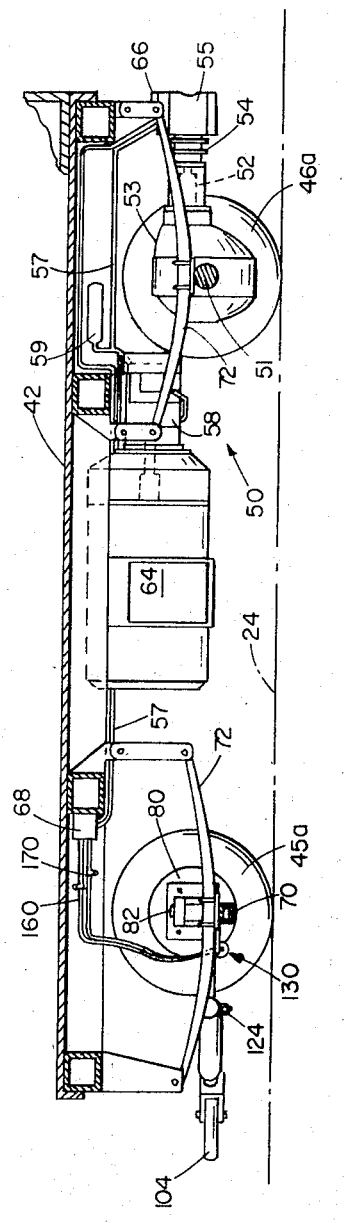

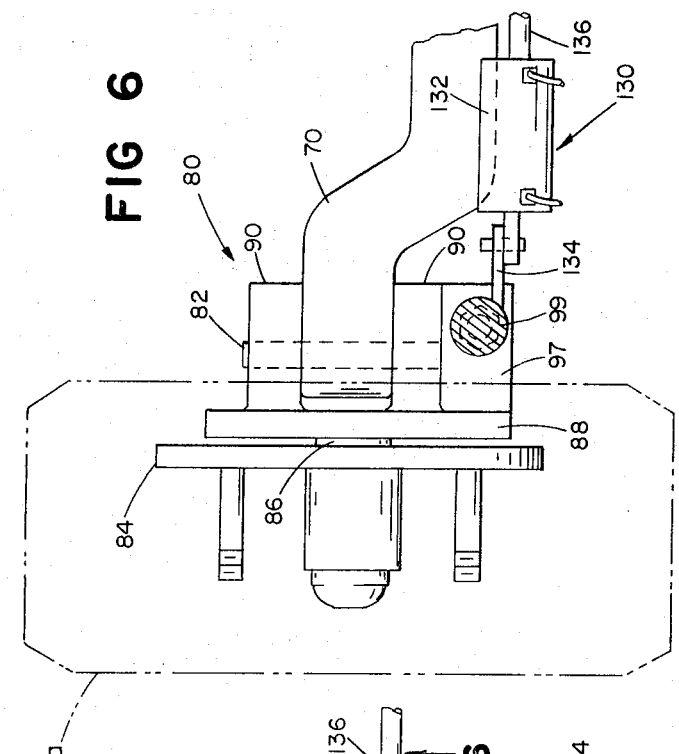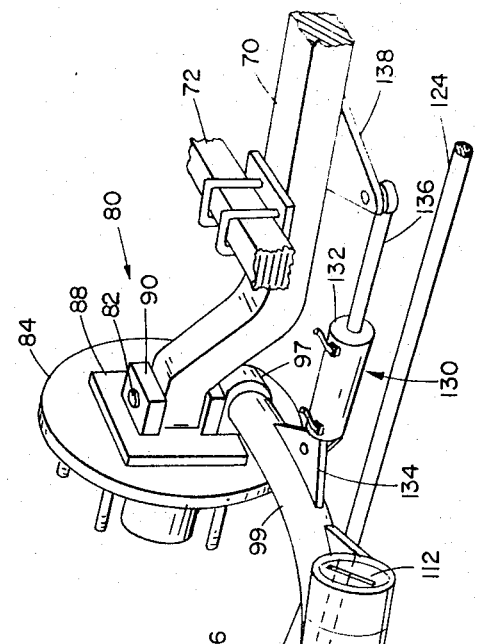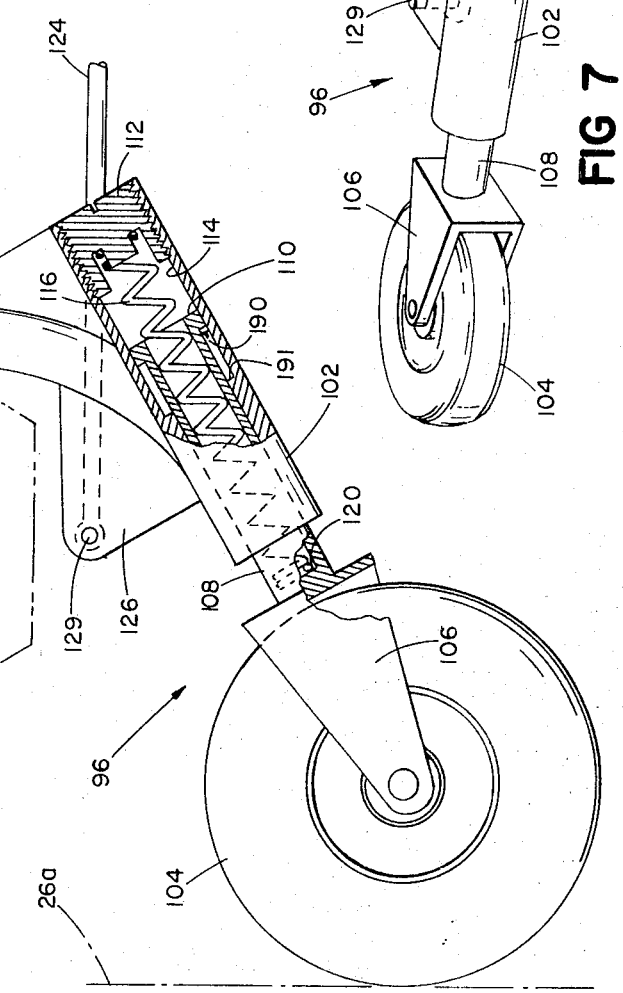

TRANSPORTATION SYSTEM

This invention relates to transportation systems and vehicles useful in such systems.

Automatic steering capability (i.e., not controlled by personnel within the vehicle) is an essential ingredient for a controlled transportation system, both not only for maintaining vehicles on roadways in an orderly and safe fashion, but also for directing the vehicles automatically onto or past intersecting roadways. An example of such a transportation system is a commuter system in which individual wheeled vehicles travel in an externally controlled manner along roadways between predetermined destinations, such as the system, described in U.S. Pat. No. 3,254,608, in which the vehicle is drivable under manual control off the roadway and can be integrated into a high density transportation system and moved on that system under automatic control. In general, these vehicles are, e.g., electrically driven while on the roadway, and are provided with an auxiliary driving system operable under power carried by the vehicle when the vehicle leaves the roadway—for example, for transportation of the commuter between the point of the roadway closest to his destination and that destination.

Other systems which might utilize such automatic steering capability include freight-carrying vehicles such as might move luggage in airports or other transportation facilities, adjuncts to commuter systems to move passenger vehicles through supply depots or garages, or adjuncts to normally manually operated vehicles (such as those riding on fluid cushions such as water or air) for directing such vehicles automatically into terminals or over roadway systems similar to those described for wheeled transportation vehicles.

Automatic switching of the vehicle is desired to move a high volume of vehicle traffic safely and accurately past intersections along the system. Hence, either some mechanism must be provided external to the vehicle which guides the vehicle past junctions, or such switching mechanisms must be incorporated into the vehicle itself, actuated by an external signal or by preprogramming the vehicle switching mechanism. Of these, the latter is a preferable method where it is desired to simplify the roadway construction.

It is desirable furthermore that such automatic steering and switching systems be dependable and precise for passenger or freight vehicles in controlling the vehicle past intersections, and yet provide comfortable and smooth vehicle operation along the roadway.

It is therefore an object of the present invention to provide new and improved steering systems for transportation systems.

Another object is to provide useful and improved in-vehicle switching systems for automatically switching vehicles safely and dependably in preselected directions at intersections.

A further object is to provide steering controls for private vehicles such as are capable of being driven automatically on controlled transportation systems and manually on conventional highways which provide positive safe, smooth and automatic vehicle control for guiding the vehicle along roadways and past intersections of the controlled transportation system, and are readily disengaged for manual vehicle operation off the controlled system.

Another object is to provide simple and improved switching systems for guiding vehicles along controlled transportation systems.

In one aspect the invention features a transportation system comprising a vehicle, a predetermined vehicle path, and a guide member extending generally along the direction of said predetermined vehicle path to provide directional guidance for the vehicle as it moves along said path. The vehicle for this system includes a steering mechanism, biasing means for biasing the steering mechanism to tend to cause the vehicle to move away from said predetermined vehicle path, and guide sensor means responsive to the guide member to control the steering mechanism, when so biased, so that the vehicle follows the guide member and therefore the predetermined vehicle path.

Preferably, the system includes two opposed guide members, each defining a vehicle path, of which at least a preselected one guide member defines the predetermined vehicle path, and selector means for operating the biasing means to bias the steering mechanism to cause said guide sensor means to be responsive to the preselected guide member. Where one guide member is located on each side of the vehicle, the steering mechanism is biased to tend to cause the vehicle to move toward the preselected guide member. Thus, where the guide member diverge at a junction, the selector means causes the vehicle to follow the correct guide member past the junction.

In a preferred embodiment, the selector means includes a switching mechanism which is located within the vehicle, and the guide member construction, except for direction, is the same at straight portions of the transportation system and at junctions. Hence, the same control system is used to steer vehicles along straightways and to switch vehicles at junctions. The result is a simple, unitary system requiring no elaborate hardware external of the vehicle. The selector means can be operated, e.g., in a preprogrammed manner by in-vehicle circuitry, or by simple extravehicular signalling means located at predetermined locations in the system, such as just prior to junctions.

In another aspect the invention features, in a vehicle, a control mechanism including a steerable wheel and a steering mechanism therefor including biasing means biasing the steerable wheel in a selected direction away from a predetermined vehicle path, and guide sensor means constructed to resist the biasing means sufficiently to maintain the vehicle on the predetermined path.

In a preferred embodiment, the vehicle has a steerable wheel supported on an axle, the guide sensor means includes a follower wheel coupled to the steerable wheel, and the biasing means comprises a hydraulic biasing assembly mounted between the follower wheel and the axle. The assembly, when actuated, causes the steerable wheel to tend to turn in one direction, thus biasing the follower wheel in that direction. However, the follower wheel movement is restricted by path-defining means external of the vehicle, so that the net effect is to cause the follower wheel, and hence the vehicle, to proceed in the direction of the external path defining means.

In the preferred embodiment, the vehicle includes two forward steerable wheels, and two rearward driven wheels the steering mechanism includes two follower wheels located forward of the center of gravity of the vehicle and outward of the sides of the vehicle and of the steerable wheels, one on each side of the vehicle body, and the biasing means is switchable between two biasing directions to bias both of the steerable wheels towards a selected external guide member. Thus, as the vehicle approaches a junction, where the guide members diverge, that guide member which continues in the direction desired for the vehicle at the junction is the one toward which the vehicle will be biased, so that the follower wheel engaging that guide member determines the direction to be taken by the vehicle at the junction.

More particularly, the preferred vehicle has an axle, two steerable wheels, and two wheel mountings, one connected to each end of the axle to mount a steerable wheel hereon in a conventional manner, so that the wheel is rotatable about a travelling axis generally parallel to the axle and about a steering axis perpendicular to the travelling axes and to the direction of vehicle travel. Linking structures secure a follower wheel to each wheel mounting for rotation with the rotatable wheel about the steering axis, and the biasing assemblies each comprise a cooperating piston rod and hydraulic cylinder, one mounted between the axle and each linking structure. A hydraulic valve controls fluid flow to the cylinders to move the piston rods in unison so as to bias the steerable wheel in the desired direction, and a switch is provided to control the valve so as to select that desired direction. It will be apparent, however, that other forms of operating mechanism, for example, electrically, mechanically or pneumatically actuated devices, could also be employed.

To isolate and prevent the introduction of unwanted steering motion resulting from minor oscillations in the path-defining means or guide member which is being followed and to provide accurate tracking, the structure linking the steerable wheel and the follower wheel is advantageously resilient (e.g., includes a spring and damper), to absorb shock and avoid operating the vehicle in an oscillating manner along the roadway. In particular, a preferred linking structure includes a cylinder secured to the steerable wheel and having a closed end adjacent thereto and an open end, a shaft aligned with the cylinder secured at one end to the follower wheel and having its opposite end facing the closed end to the follower of said cylinder, and a spring disposed between the shaft and the closed end of the cylinder which achieves damping. The described shaft has an enlarged head slidably received within the cylinder, and the cylinder has stops for limiting shaft movement so as to limit the freedom of movement of the follower wheel in response to the guide member.

In the illustrated embodiment, there is also provided a safety switch to indicate the lack of resistance of the follower wheel to applied bias, as might happen for example if there was an interruption in the guide member. This switch is advantageously located at one of the cylinder stops, and is actuated by engagement of the shaft head therewith. There may then be connected with this switch suitable safety mechanisms for slowing down, stopping or otherwise controlling the vehicle, or signalling a controller to assume another mode of operation of the vehicle.

The illustrated embodiment includes a hydraulic motor for the vehicle itself which may be part of a single simple hydraulic system which provides not only the drive motor for the vehicle and the biasing means but also, for example, can be connected to the braking system, the door opening system, and the like. The hydraulic motor provides a substantially continuous range of speeds for the vehicle while traveling along the roadway, and can be operated by external control means for automatic operation of the vehicle on the roadway.

Other objects, features and advantages will be apparent from the following description of a preferred embodiment of the invention, taken together with the attached drawings thereof, in which:

FIG. 3 is a top view of a vehicle having a control system constructed in accordance with the present invention, with portions of the vehicle broken away;

FIG. 4 is a sectional view of the vehicle of FIG. 3;

FIG. 5 is a top view, drawn to a larger scale, of a portion of the control apparatus;

FIG. 6 is a sectional view of the steerable control system doing along line 6—6 of FIG. 5;

FIG. 7 is a perspective view of the control system;

DESCRIPTION OF PARTICULAR EMBODIMENT

Figure 1:
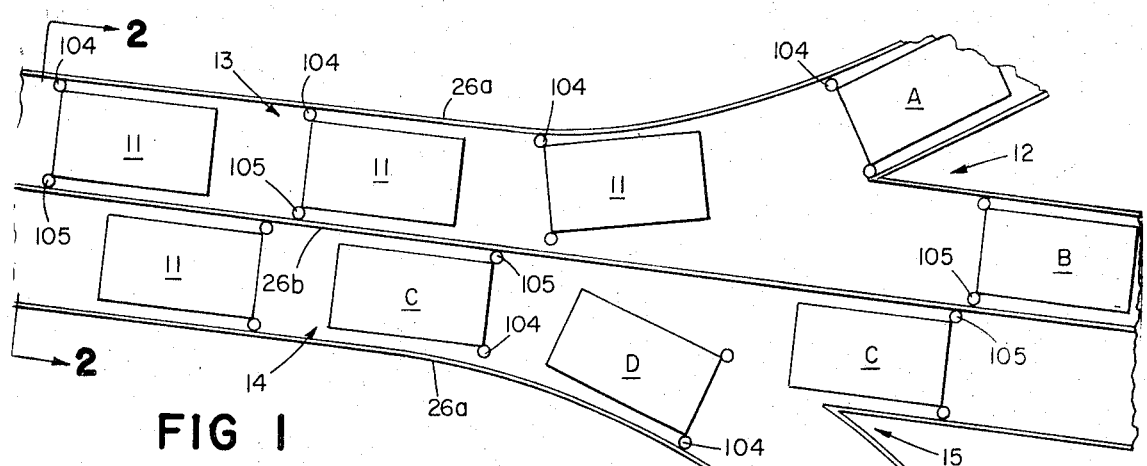
FIG. 1 is a schematic view of a transportation system utilizing the vehicle control system of the present invention.
Figure 2:
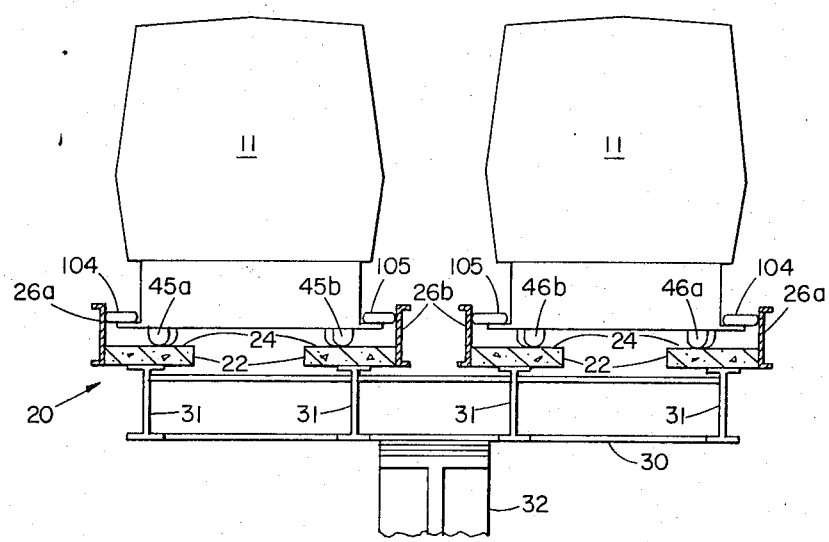
FIG. 2 is a sectional view of the roadway of FIG. 1 showing the roadway for carrying the vehicles and vehicles oriented thereon.

FIG. 1 shows a portion of a main line of a transportation system having vehicles 11 equipped with control systems constructed in accordance with the present invention, and includes roadway junctions 12 at which vehicles pursue one of two roadways. Two main roadways 13, 14 are illustrated for travel in opposite directions. As indicated in FIG. 2, both roadways 13, 14 are supported on a common structure 20 including spaced support members 22, each having a smooth horizontal surface 24 (which may be paved with suitable asphalt material, for example, to increase the frictional coaction with the vehicle wheels that engage that surface) and two upstanding guide members 26a, 26b for guide and safety purposes, disposed generally perpendicular to surface 24. Structure 20 includes support framework 30 which has vertical support members 31 to support surfaces 24. The framework 30 is further supported on support beams 32 where the roadways are elevated.

Referring now to FIGS. 3 and 4, each vehicle 11 includes a frame 42 and four foam-filled, rubber-tired road wheels 45a, 45b, 46a, 46b, the front wheels 45a, 45b being steerable and the rear wheels 46a, 46b being driven by the motor drive system 50. Motor drive system 50 includes a rear axle assembly 51 on which are mounted wheels 46a, 46b, which is coupled to drive shaft 52, through differential 53. THe other end of drive shaft 52 is driven by hydraulic motor 54, which is connected through variable displacement hydraulic servo 55 controlled by electronic circuitry 56 of the type disclosed in copending application Ser. No. 41,994, filed June 1, 1970 in the names of Morley et al., entitled "Transportation System" and assigned to the same assignee as this application. Hydraulic fluid is applied over lines 57 from pump 58 to an accumulator 59 and to servo 55 and returned to pump 58 via cooler 60. Pump 58 is connected through a pump adapter 62 to AC motor 64. The direction of fluid flow to the motor 54 and hence the direction of axial rotation is controlled by electrically actuated valve 66. This hydraulic system enables continuous smooth response and changes in speed over a wide range of rotational speeds. Hydraulic fluid is also supplied from line 57 to the steering control system 68.

Referring now to FIGS. 3–7, showing the vehicle control system in more detail, each front wheel 45a, 45b is supported on a front axle 70 which may be secured to the vehicle frame 42 by a suitable resilient coupling such as leaf springs 72. Each end 80 of axle 70 is formed to receive a conventional kingpin assembly 82. Each wheel 45a, 45b includes a disc 84 rotatable on a shaft 86 which is affixed to plate 88. Flanges 90 are also constructed to receive kingpin 2 therethrough, so as to allow the entire wheel structure to rotate relative to the end of axle 80, as in conventional steering systems. Follower structures 95 and 96 each include a coupling member 97 secured to plate 88, in which is secured, by kingpin 82, one end of connector tube 99. The opposite end of tube 99 is secured to cylinder 102. Follower wheel 104 (inflated or foam-filled rubber) is rotatably secured on coupling 106 which is in turn secured to shaft 108, which extends into the interior of cylinder 102 and terminates is an enlarged head 110. Within cylinder 102 is a threaded end cap 112, and a counterbore 114, within which is slidably received the head 110 of shaft 108. A spring 116 has one end secured to end cap 112 and the other end abutting the solid end 120 of shaft 108, thereby isolating the movements of follower wheel 104 resulting from guideway irregularities from the steerable assemblies 45a and 45b. A tie rod 124 extends from web 126 to web 128, each web being secured to a corresponding tube 99, and is rotatably secured to each web 126, 128 by an appropriate connector 129.

Hydraulic piston assembly 130 includes a cylinder 132 rotatably secured to connecting web 134 which is in turn secured to connector tube 99, and a piston rod 136 which is rotatably secured to a connecting web 138 secured to axle 70. A similar piston assembly 139 is provided for front wheel 45b. As seen in FIG. 2, each follower wheel 104, is disposed to abut a rail 26 in a manner be described.

Figure 8:
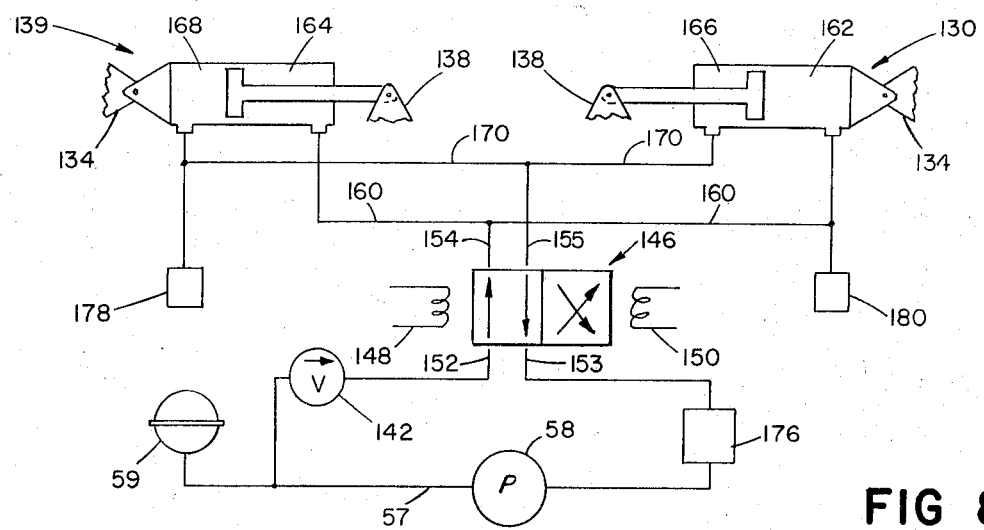
FIG. 8 is a schematic diagram of a hydraulic system for operating a portion of the control system.

Referring to the hydraulic diagram of steering control system 68 shown in FIG. 8, in which the hydraulic piston assemblies 130, 139 are shown somewhat schematically, a hydraulic supply including pump 58 and accumulator 59 are connected via line 57 through check valve 142 to a selector valve 146 controlled by solenoid coils 148, 150. Coupled to the valve are inlet line 152, return line 153 and two transfer lines 154, 155. By rotating the valve 146 in response to energization of the appropriate coil 148 or 150, the connection of the inlet and the outlet lines to the transfer lines may be reversed. In particular, when the valve is in the position shown in FIG. 8, hydraulic fluid is applied through line 160 and a port at the right end of chamber 162 of piston assembly 130 and hydraulic fluid will also enter through a port at the right end of chamber 164 of the piston assembly 139. Hydraulic fluid will then exit through ports from the left end of chamber 166 of piston assembly 130 and the chamber 168 of piston assembly 139 through lines 170 and 155 for return through valve 146 to a reservoir 176. When the valve is rotated to the opposite position fluid will enter through line 170 into the left ends of chambers 166 and 168 and fluid return flow will occur through line 160 from the right ends of chambers 162 and 164. Thus, the pistons operate in unison, and the total area of the piston head surfaces against which fluid is being directed is the same in both hydraulic directions so that equal pressure is applied in either direction for steering purposes. Fluid responsive switches 178 and 180 are provided to indicate which end of the chambers 166, 164 is under pressure at any one time, thereby indicating the position of the rotatable valve 146 and therefore indicating the bias being applied to the steering mechanism.

In operation, the switch 146 is rotated, for example, to the position shown in FIG. 8. In this position, the piston rods are being biased to the left in FIG. 8. Referring to FIG. 3, the piston rods are thus biased so that the distance between connector 134 and connector 138 would tend to increase for assembly 130 and to decrease for assembly 139, thereby biasing wheel 45a toward guide member 26a, and further by reason of the tie rod connection between the wheels 45a and 45b, tending also to similarly turn wheel 45b. Thus, the whole vehicle is biased toward guide member 26a. However, this tendency is resisted by follower wheel 104, and this resistance is resiliently transmitted back to wheel 45a through spring 116 and tube 99 in a balancing manner to keep the vehicle a fixed distance away from guide 26a. The spring 116 has a spring force chosen so that there will be resilient damping of any minor fluctuations in the surface of guide member 26a. At the same time, since the wheels are generally biased towards guide member 26a, there is no tendency for follower wheel 105 to be biased against guide member 26b and the vehicle will not follow guide member 26b. The vehicle therefore follows one direction of guide member 26a as that member curves or straightens. If the hydraulic fluid flow is reversed, by reversing the position of valve 146, the bias would be applied in the reverse direction to wheel 45b tending to make wheel 45b turn toward guide member 26b and by reason of the tie rod connection between the wheels, tend to make wheel 45a turn also in that direction. However, again the tendency of the vehicle thus to turn will be resisted by follower wheel 105 so that the vehicle will therefore follow the direction of guide member 26b.

A safety switch, indicated generally at 190, may be connected to the head 110 of each shaft 108 supporting a follower wheel 104 or 105, in such a way that if the head 110 abuts the shoulder 191 formed by counterbore 114, a signal will be given. An appropriate response may shift the steering bias to the other side and/or slow down or stop this and other cars on the roadway to produce safe functioning for the system. One circumstance in which a follower wheel might tend to go to such a distance would be an interruption or break in the guide member, which could cause the vehicle to leave the roadway.

The steering mechanism thus described is useful, for example, for choosing the direction of movement for the vehicle at a junction such as shown in FIG. 1. The vehicles A traveling generally from right to left (upper row) enter the main roadway 13 smoothly from a spur by having their follower wheels 104 biased against the guide member 26a whereas the vehicles B traveling along the highway have their follower wheels 105 biased against the guide member 26b of the roadway, so that they pass the junction smoothly. Similarly, vehicles traveling from left to right in FIG. 1 may take exit at junction 12. The vehicles C have their follower wheels 105 biased against the guide member 26b of roadway 14 and therefore they will pass by the junction and continue along the main roadway. The vehicles D have their follower wheels 104 biased against the guide member 26a so that these vehicles will take the exit spur and leave the main highway system. Appropriate externally operated switching means may be provided just before the junction, so that vehicles preceding to the junction may have their proper follower wheels biased against the guide member corresponding to the predetermined desired vehicle path past the junction. Such switching may be actuated in accordance with a directional program set for the vehicle when it enters the roadway system. Thus the switching is done automatically so that no manual steering of the vehicles is necessary.

Figure 9:
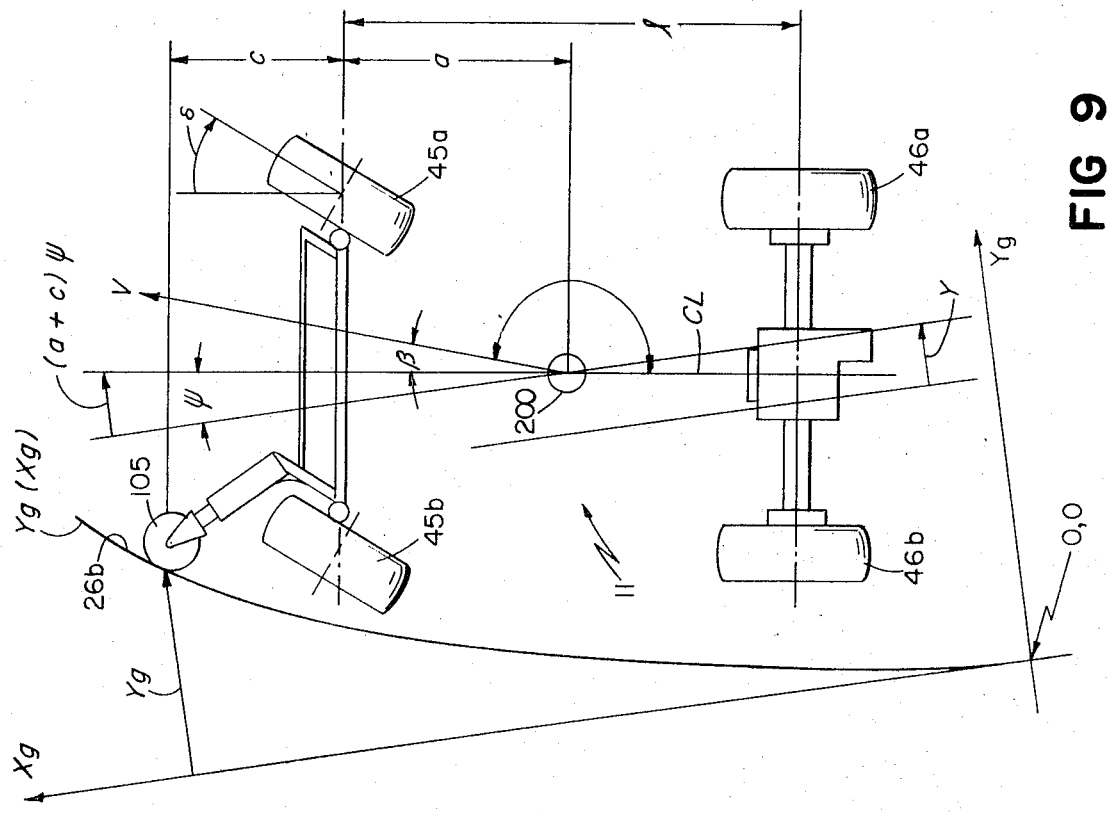
FIG. 9 is a schematic view of a portion of a vehicle having a control system constructed in accordance with the present invention, and illustrating certain features of that system.

FIG. 9 is a force diagram showing a vehicle 11 following a curved roadway portion, which was straight prior to the location $X_g=0$, the center of gravity of the vehicle being indicated at 200. The follower wheel 105 of the vehicle is biased against the guide member 26b of the roadway portion. For convenience, the follower wheel 104 is not shown.

As the result of the front wheel deflection, $\delta$ (from a line parallel to the vehicle centerline, CL) the vehicle centerline CL acquires an azimuth angle, $\psi$ (to a reference direction $X_g$) and the vehicle linear velocity V becomes misaligned with the vehicle centerline CL by the sideslip angle $\beta$. As a particular example, let:

$m$=3,500 lb.
$l$=70 in.
$a$=35 in.
$g$=32.2 ft./sec.$^2$
$k_z$=30 in.
CP=150 lb./deg. (8600 lb./rad.), where $k_z$ is from the equation for the moment of inertia, $I_z=mk_z^2$ of the vehicle about its vertical axis, $m$ is the vehicle mass, and CP is the "cornering power," or slope of the tire cornering force vs. slip angle curves.

The slip angle equations are:
front tire: $\alpha_1=\beta+(a/V)(d\psi/dt)-\delta$; and
rear tire: $\alpha_2=\beta-(1-a)V(d\psi/dt)$. Hence, the equations of motion are the yawing moment equation:

$$I_z(d^2\psi/dt^2)=N=-2a\,CP\alpha_1+2(1-a)CP\alpha_2;$$

and the side force equation:

$[mV(d\psi/dt)+(d\beta/dt)]Y=-2CP\alpha_1-2CP\alpha_2$. Substituting, and applying Laplace transform methods, the response of the vehicle to step front wheel deflections $(t=0, \delta=0; t>0; \delta=\delta_{ss})$ may be calculated. At 30 m.p.h., for example, a front wheel deflection of only 0.009,58 rads (0.55 degrees) is required to hold a steady lateral acceleration of 0.1$g$, making precise control of the vehicle possible with very small wheel deflections.

Furthermore, during travel of the vehicle along substantially straight portions of roadways, i.e., where $\psi$, $\beta$, and $\delta$ are small angles, and $X_g>>Y_g$, one obtains, from the Laplace transform of the equations of motion, a characteristic equation of motion:

$0.0455/\lambda^2[\lambda^4+17.02\lambda^3+375\lambda^2+2445\lambda+14,225]=0$ There are two oscillatory modes corresponding to this equation, both of which are extremely well damped and hence disappear quickly. Of these modes, the lower frequency mode, has an undamped natural frequency of 7.69 rads/sec. and a damping ratio of 50.5 percent critical, whereas the high frequency mode has undamped natural frequency of 15.6 rads/sec. and a damping ratio of 29.6 percent critical. Hence, the steering system is extremely stable in passing minor variations over essentially straight roadway portions, providing both comfortable and safe vehicular movement. In addition, the actual resilient spring linkage between follower wheel and road wheel, which was not considered in deriving the equations, actually prevents many minor roadway irregularities from causing any wheel deflection at all.

Figure 10:
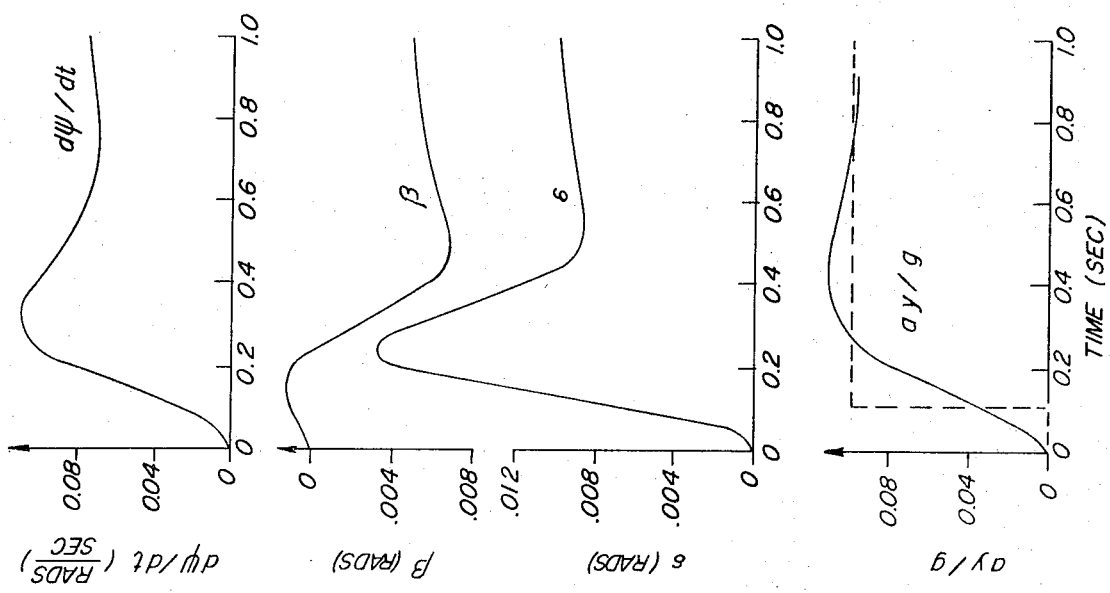
FIG. 10 is a graph illustrating response times for steering system.

Moreover, for a curved roadway such as shown in FIG. 9, where $Y_g=C_xX_g^2$, i.e., where the guideway is a parabolic function of $X_g$. For $X=0$; one arrives, for a speed of 30 m.p.h. and a lateral acceleration of 0.1$g$, at the following expressions for $d\psi/dt$, $\beta$, $\delta$, and $A_y/g$ ($A_y$= lateral acceleration) as functions of $t$. The responses of these various functions with time are shown in FIG. 10.

$$\frac{d\psi}{dt} = 0.073, 0 + 0.119, 1e^{-\frac{t}{0.258}} \cos\left[\frac{t}{0.945} \times 360° - 90° - 59.7°\right]$$

$$+ 0.053, 2e^{-\frac{t}{0.217}} \cos\left[\frac{t}{0.422} \times 360° + 90° - 34.1\right]$$

$$\beta = -0.005, 32 + 0.012, 58e^{-\frac{t}{0.258}} \cos\left[\frac{t}{0.945} \times 360° - 57.9°\right]$$

$$+ 0.03, 68e^{-\frac{t}{0.217}} \cos\left[\frac{t}{0.422} \times 360° + 90° + 21.5°\right]$$

$$\delta = 0.009, 70 + 0.014, 36e^{-\frac{t}{0.258}} \cos\left[\frac{t}{0.945} \times 360° - 90° - 11.4°\right]$$

$$+ 0.011, 40e^{-\frac{t}{0.217}} \cos\left[\frac{t}{0.422} \times 360° + 180° - 53.3°\right]$$

$$A_y/g = Y_\beta \beta + Y_\delta \delta$$

$$= 0.1000 + 0.0870e^{-\frac{t}{0.258}} \cos\left[\frac{t}{0.945} \times 360° + 180° - 24.0°\right]$$

$$+ 0.0235e^{-\frac{t}{0.217}} \cos\left[\frac{t}{0.422} \times 360° + 180° = 53.3°\right]$$

Thus, the tracking response of the vehicle for changes in guide member direction is practically instantaneous, providing fast, precise, and safe steering of the vehicle.

Although the foregoing analysis was based on an essentially linear model—i.e., disregarding such factors as wheel suspension and other degrees of freedom, these other factors will not affect the foregoing results to any significant extent.

Vehicles which are to be drivable by manual control off the roadway may be equipped with auxiliary conventional steering systems, and appropriate clutching or switching means may be provided for changing vehicle control from the described automatic steering system to the manual system. Advantageously, signalling devices may be located at the roadway terminus to actuate such clutching or switching means.

Other embodiments will occur to those skilled in the art and are within the following claims.

What is claimed is:

1. In a transportation system comprising
   structure defining
   a predetermined vehicle path having a generally horizontal surface that provides a support for a vehicle as it moves therealong, said path including a main portion and a spur portion connected to said main portion at a junction, and
   a pair of fixed opposed spaced guide surfaces extending along said drive surface for providing directional guidance to a vehicle as it moves along said path, said guide surfaces diverging from one another at said junction, a vehicle for use on said vehicle path, said vehicle having a travel axis extending front to back through its center of gravity along which said vehicle moves in straight line motion, a steering mechanism for diverting said vehicle from movement along its travel axis, and a dynamically responsive vehicle steering and path selection control comprising biasing means for biasing said steering mechanism in either of two directions to steer said vehicle along a path either to the left or to the right of its travel axis, two guide follower wheels mounted for rotation about generally vertical axes, means resiliently connecting each said follower wheel to said steering mechanism to damp minor oscillations of each said follower wheel and isolate such oscillations from said steering mechanism, said guide follower wheels being disposed forwardly of said steering mechanism and the center of gravity of said vehicle, and selector means for operating said biasing means to selectively bias said steering mechanism in either of said two directions to divert said vehicle from movement along its travel axis and cause a corresponding guide follower wheel to engage and maintain substantially continuous contact with the cooperating guide surface, the biasing force imposed by said biasing means on said steering mechanism being opposed and overcome by the reaction between the guide surface and the guide follower wheel engaged therewith so that said vehicle moves along said vehicle path as controlled by the direction of the guide surface engaged by said follower wheel.

2. The transportation system of claim 1 wherein one said guide surface is located on each side of said vehicle path, one said follower wheel is located on each side of said vehicle, said selector means biases said steering mechanism to steer said vehicle to move toward a selected guide surface, and the follower wheel that engages said selected guide surface maintains said vehicle a predetermined distance from said selected guide surface.

3. The transportation system of claim 1 wherein said guide surfaces, independent of junctions, and said follower wheels are mutually constructed so that the follower wheel corresponding to the nonselected guide surface is also in substantially continuous contact with the nonselected guide surface.

4. The vehicle of claim 1 including two steerable wheels, steered in unison by said steering mechanism, and fixed support structure therefor, and wherein said biasing means comprises a biasing assembly mounted between one said steerable wheel and said wheel support structure for steerably rotating said steerable wheels relative to said support structure, said biasing assembly comprising means selectively operable in either of two modes to bias said steerable wheels in either of two generally opposite directions away from said vehicle travel axis.

5. The vehicle of claim 4 wherein said biasing means includes two biasing assemblies, one of said assemblies is mounted between each of said steerable wheels and said fixed structure, and said selector means for operating said biasing assemblies in unison in one of two opposite operating modes to bias said wheels in a selected one of two generally opposite directions away from said vehicle travel axis.

6. The vehicle of claim 5 wherein each said biasing assembly comprises a piston rod having a piston head, and a hydraulic cylinder having two fluid ports, one located on either side of said piston head, and said selector means comprise a hydraulic valve directing fluid to one port of each cylinder and away from the other port of each cylinder, said ports selected to move both said pistons in unison in directions tending to bias said steerable wheels in the same direction, and switching means for said valve.

7. The vehicle of claim 1 wherein said resilient connecting means further includes a safety switch actuated by a predetermined large movement of said follower wheel in a direction away from said steerable wheel.

8. The vehicle of claim 1 and further including selector means for operating said biasing means to bias said steering mechanism to close said guide sensor means to be responsive to a preselected one of a plurality of path defining means external of said vehicle to select a corresponding one of a plurality of predetermined paths at a junction.

9. In a vehicle, a steering mechanism, and a control mechanism for said steering mechanism including biasing means for biasing said steering mechanism in a selected direction away from a predetermined vehicle path, and guide sensor means constructed to resist said biasing means in response to path defining means external of said vehicle sufficient to maintain said vehicle on said predetermined path, said guide sensor means comprising a follower wheel adapted to contact guide means disposed along the said selected direction of travel, and a linking structure connected at one end to said follower wheel and at the other end to said steering mechanism so that said steering mechanism and said follower wheel turn on the same axis through the same arc during turning of said vehicle, said linking structure including a cylinder secured to said steering mechanism and having a closed end adjacent thereto and an open end, a shaft aligned with said cylinder secured at one end to said follower wheel and having its opposite end facing the closed end of said cylinder, and a pring disposed between the said opposite end of said shaft and the closed end of said cylinder for damping movement of said follower wheel.

10. The vehicle of claim 9 wherein said shaft has an enlarged head slidably received with said cylinder, said cylinder includes stops for limiting axial sliding movement of said shaft relative to said cylinder to limit movement of said follower wheel in response to said path-defining means, and said vehicle includes a switch actuated upon engagement of said head and one of said stops.

11. The vehicle of claim 10 wherein said cylinder includes a counterbore providing an annular shoulder defining said stop.

* * * * *

PO-1050
(5/69)

UNITED STATES PATENT OFFICE
CERTIFICATE OF CORRECTION

Patent No. 3,643,601                    Dated February 22, 1972

Inventor(s) Paul A. Taylor and Thomas A. Boissevain

It is certified that error appears in the above-identified patent and that said Letters Patent are hereby corrected as shown below:

Column 2, line 60, change "hereon" to --thereon--.

Column 4, line 39, the numeral "2" should be --82--.

Column 8, line 57, "close" should be --cause--.

Column 9, line 4, change "pring" to --spring--.

Signed and sealed this 15th day of August 1972.

(SEAL)
Attest:

EDWARD M.FLETCHER,JR.           ROBERT GOTTSCHALK
Attesting Officer               Commissioner of Patents